No. 836,980. PATENTED NOV. 27, 1906.
J. C. LITTLE.
HARROW.
APPLICATION FILED APR. 6, 1906.
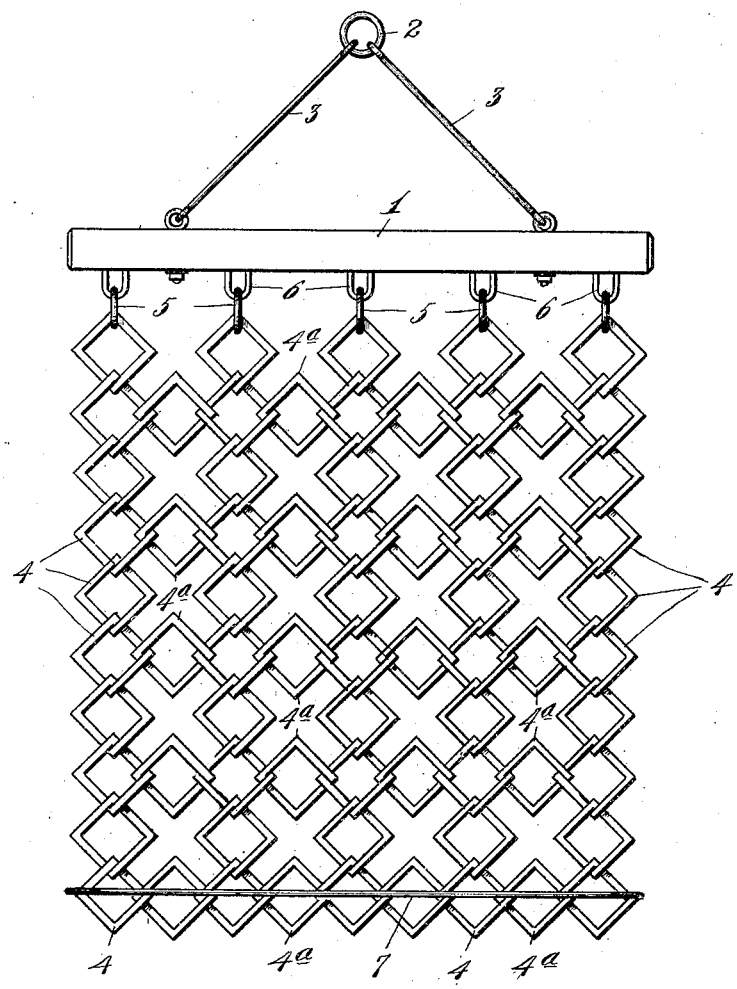
Witnesses:
E. W. Jeppesen.
A. H. Opsahl.
Inventor:
J. C. Little.
By his Attorneys.
Williamson & Merchant

UNITED STATES PATENT OFFICE.

JOHN C. LITTLE, OF NEW RICHMOND, WISCONSIN.

HARROW.

No. 836,980.     Specification of Letters Patent.     Patented Nov. 27, 1906.

Application filed April 6, 1906. Serial No. 310,273.

*To all whom it may concern:*

Be it known that I, JOHN C. LITTLE, a citizen of the United States, residing at New Richmond, in the county of St. Croix and State of Wisconsin, have invented certain new and useful Improvements in Harrows; and I do hereby declare the following to be a full, clear, and exact description of the invention, such as will enable others skilled in the art to which it appertains to make and use the same.

My invention has for its object to provide a simple, cheap, and efficient harrow; and to this end it consists of the novel devices and combinations of devices hereinafter described, and specified in the claim.

The invention is illustrated in the single view of the accompanying drawing, which view shows the improved harrow in plan.

Referring to the drawing, the numeral 1 indicates a drag-beam, which, as shown, is connected to a ring 2 by means of a pair of pivotally-connected drag-bars 3. To the drag-beam 1 is connected a plurality of chains made up of rectangular links 4, the front links, as shown, being connected by rings 5 to staples 6, which latter are secured to the rear edge of said drag-beam 1.

At suitable intervals of space the links of the parallel adjacent chains are tied together or connected by rectangular links 4ª, that are passed through the links which they connect in such manner that the said links 4ª are free to oscillate in vertical planes, thereby permitting their projecting angles to enter the ground to a considerable extent. In fact, all of the links 4 and 4ª are canted slightly or turned out of horizontal planes, so that certain of their projecting angles scrape the surface of the soil over which the harrow is drawn. The rearmost links 4 of the longitudinally-extended chains at the extreme outer edges of the harrow interlock with the end links of the transverse chain which is made up of the links 4, that are at the extreme rear portion of the harrow, so that there is provided, in effect, a continuous chain following a rectangular course along the sides and rear of the harrow. The rearmost links of the two outer chains are held spaced apart by a spacing-rod 7, and by this device several chains are held spread out, so that their harrow will cover a considerable surface.

The ring 2 of course affords a device to which a suitable drive-link may be attached for the purpose of drawing the harrow over the ground.

The harrow described, while of small cost, is efficient for the purposes had in view, has no parts that are liable to get out of order, to wear out in any ordinary length of time, or to be broken.

What I claim is—

In a harrow, the combination with a drag-bar 1, of a plurality of chains attached to said beam at their forward ends and made up of rectangular links 4, intermediate rectangular links 4ª interlocked with and connecting alternately adjacent links of the said parallel chains, and a spacing-rod 7 attached at its ends to the rearmost links of the outside chains, the most rearward links of the said outside chains being interlocked with the end links of the chain made up of the links 4 that extend transversely at the rearmost portion of the harrow, substantially as described.

In testimony whereof I affix my signature in presence of two witnesses.

JOHN C. LITTLE.

Witnesses:
    J. L. MINUR,
    JOHN MARTIN.